(12) United States Patent
Van Der Winkel et al.

(10) Patent No.: US 7,580,677 B2
(45) Date of Patent: Aug. 25, 2009

(54) COMMUNICATIONS INTERFACE DEVICE FOR RECEIVING DIGITAL SIGNALS

(75) Inventors: Ramon Van Der Winkel, Helsingborg (SE); Tobias Lindqvist, Sundbyberg (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 945 days.

(21) Appl. No.: 10/468,260

(22) PCT Filed: Feb. 15, 2002

(86) PCT No.: PCT/EP02/01695

§ 371 (c)(1), (2), (4) Date: Dec. 8, 2003

(87) PCT Pub. No.: WO02/069570

PCT Pub. Date: Sep. 6, 2002

(65) Prior Publication Data

US 2004/0106377 A1    Jun. 3, 2004

(30) Foreign Application Priority Data

Feb. 27, 2001    (EP) .................................. 01610016

(51) Int. Cl.
*H04B 7/00*    (2006.01)
(52) U.S. Cl. ..................... 455/41.2; 455/574
(58) Field of Classification Search ................. 455/41.2, 455/38.3
See application file for complete search history.

(56) References Cited

U.S. PATENT DOCUMENTS 5,003,578 A * 3/1991 Lin ..................... 379/102.04
5,465,392 A * 11/1995 Baptist et al. ............... 370/310
5,706,110 A * 1/1998 Nykanen ..................... 398/35
5,907,418 A    5/1999 Walczak et al.

FOREIGN PATENT DOCUMENTS

EP    0615364 A1    9/1994
WO    WO98/41001    9/1998

OTHER PUBLICATIONS

Iain Millar et al., "The IRDA Standards for High-Speed Infrared Communications", The Hewlett Packard Journal, Feb. 1, 1998, pp. 10-25; vol. 49, No. 1, Hewlett Packard Co., Palo Alto, CA, USA; XP000766837.

* cited by examiner

*Primary Examiner*—Duc Nguyen
*Assistant Examiner*—Zhiyu Lu
(74) *Attorney, Agent, or Firm*—Potomac Patent Group PLLC

(57) ABSTRACT

A communications interface device (4) has circuitry for receiving digital signals in the form of characters according to a protocol defining that a communications link is initialized by a series of start characters, each having a specified duration. The receiving circuitry can assume a first state in which characters can be detected, and a second state in which detection of characters is not possible. Power consumption is higher in the first state than in the second state. The device can alternate the receiving circuitry periodically between the first state and the second state with a period shorter than the duration of the series of start characters. In each period the receiving circuitry assumes the first state for a time longer than the duration of a start character. A communications link is established if a character is detected. The power consumption can be reduced considerably without causing unnecessary inconvenience and time consumption for the user.

16 Claims, 3 Drawing Sheets

XBOF = 0xFF

XBOF = 0xC0

COMMUNICATIONS INTERFACE DEVICE FOR RECEIVING DIGITAL SIGNALS

CROSS REFERENCE TO RELATED APPLICATIONS

This application claims the benefit of U.S. Provisional Application No. 60/272,042, filed Mar. 1, 2001, which is hereby incorporated herein by reference in its entirety.

TECHNICAL FIELD OF THE INVENTION

The invention relates to a method of establishing a communications link for exchanging digital signals in the form of characters between a transmitter and a receiver, wherein the transmitter for initialization of a communications link transmits a series of start characters. The invention further relates to a communications interface device.

DESCRIPTION OF RELATED ART

Short-range communications systems are often used for communication between two (or more) devices located within a short distance from each other. Examples of such systems are infrared interfaces, short-range radio interfaces, such as a Bluetooth interface, or wired connections, and examples of the use of such systems include the communication between a mobile telephone and a portable computer, the communication between a personal computer and a printer, or the communication between a mobile telephone and an auxiliary equipment, such as a digital camera or an external memory device.

In such systems there will usually be long periods of time in which there is no actual exchange of information to or from a given device, either because there is no other device located within the range of the device, or because there is no information to be exchanged. For instance, in the communication between a personal computer and a printer, information is exchanged only when a document is being printed.

However, the receiver part of an interface must be switched on more or less all the time, and thus consumes power, although it is only utilized a small fraction of the time. For instance, in the above mentioned computer/printer example, the printer has no possibility of predicting when the user of the computer intends to print a document, and thus the receiver interface of the printer must be ready for receiving information as long as the computer is in use.

A switched-on interface which is not in the process of exchanging information can typically be in a primary mode or in a secondary mode. In the primary mode the interface actively searches for other interfaces of the same type, normally because it has information to transmit. An interface in the primary mode will typically search for other interfaces with intervals and transmit in each interval a series of start characters. The start characters do not contain any information that needs to be propagated or stored in the receiving device, but are merely used to help the receiver initiate itself for receiving actual data. In the secondary mode the interface only listens for an interface in primary mode to contact it, and, as mentioned above, an interface will typically be in the secondary mode most of the time. However, even in the secondary mode the interface has a considerable power consumption.

Especially in portable and battery powered devices the power consumption is an important issue, because it affects the stand-by time or operating time of the device between re-chargings of the battery, and thus it is a drawback that the receiver interface has to be switched on all the time. Of course the receiver interface can be switched on and off manually by the user of the devices so that the receiver only consumes power when it is needed for reception of information, but this solution will normally be inconvenient and time consuming for the user, who may have to switch the receiver interface on and off frequently, and further, the user does not always have sufficient knowledge about when information is going to be exchanged.

WO98/41001 discloses a system in which an interface between a mobile telephone and a PC (personal computer) is accomplished via an infrared link. When the telephone is in a passive standby mode, pressing a certain sequence of keys will start the infrared transceiver of the telephone to monitor or poll for incoming infrared signals with a view to establishing an infrared link between the telephone and the PC. If during a 20-second period signals seeking to create an infrared link are received, such a link is established. If, however, no link is established after the 20-second period, the telephone will discontinue monitoring the incoming infrared signals. Although this system has the possibility of switching off the receiver automatically, if no link is established during the 20-second period, the user still has to switch it on manually, and he even has to switch it on again, if expected signals from the PC did not show up within the first period. Thus this system also suffers from the problems mentioned above.

Therefore, it is an object of the invention to provide a method of the above-mentioned type in which the power consumption can be reduced considerably without causing unnecessary inconvenience and time consumption for the user.

SUMMARY

According to the invention the object is achieved in that the method comprises the steps of controlling the receiver to alternate periodically between a first state in which characters can be detected, and a second state in which detection of characters is not possible, with a period shorter than the duration of the series of start characters, the receiver having a power consumption which is higher in the first state than in the second state, and the alternation being controlled such that in each period the receiver assumes the first state for a time which is longer than the duration of a start character; and establishing a communications link if a character is detected.

By allowing the receiver to be in a receiving state for only a fraction of each period, said fraction being sufficiently large, and the period being sufficiently short, to detect a start character sent by a transmitter, and allowing the receiver to be in a less power consuming state the rest of the time, the power consumption of the receiver can be reduced considerably, while it is still ensured that any start character is detected.

When the method further comprises the step of keeping the receiving circuitry in the first state for a longer time when a communications link is established, it is ensured that after a detected start character the receiver remains in the first state so that the following data characters can also be detected.

The digital signals can be transmitted via a wired connection, via a radio channel, via an infrared channel, or as other optical signals.

When the digital signals are transmitted via an infrared channel, they may be transmitted according to the IrDA protocol, and they may be transmitted with a data rate of 9600 bit/s. The start character may be an XBOF character. The method may be used in a mobile telephone.

As mentioned, the invention also relates to a communications interface device having receiving circuitry for receiving digital signals in the form of characters from an external transmitter according to a protocol defining that a communications link is to be initialized by transmitting a series of at least a prescribed number of start characters, each start character having a specified duration; said receiving circuitry being able to assume a first state, in which characters can be detected, and a second state, in which detection of characters is not possible; and said receiving circuitry having a power consumption which is higher in the first state than in the second state.

When the device comprises control means adapted to alternate the receiving circuitry periodically between the first state and the second state with a period shorter than the duration of the series of start characters, such that in each period the receiving circuitry assumes the first state for a time which is longer than the duration of a start character; and the control means is further adapted to establish a communications link if a character is detected, the power consumption can be reduced considerably without causing unnecessary inconvenience and time consumption for the user. By allowing the receiver to be in a receiving state for only a fraction of each period, said fraction being sufficiently large, and the period being sufficiently short, to detect a start character sent by a transmitter, and allowing the receiver to be in a less power consuming state the rest of the time, the power consumption of the receiver can be reduced considerably, while it is still ensured that any start character is detected.

When the control means is further adapted to keep the receiving circuitry in the first state for a longer time when a communications link is established, it is ensured that after a detected start character the receiver remains in the first state so that the following data characters can also be detected.

The receiving circuitry may be adapted to receive the digital signals as electrical signals on a wired connection, or the receiving circuitry may comprise a receiver for radio frequency signals or a receiver for infrared signals.

When the receiving circuitry comprises a receiver for infrared signals, the receiving circuitry may be arranged to communicate according to the IrDA protocol, and it may be arranged to communicate with a data rate of 9600 bit/s. The start character may be an XBOF character.

When the device further comprises transmitter circuitry, the same interface device may be used for reception as well as transmission of digital signals.

BRIEF DESCRIPTION OF THE DRAWINGS

The invention will now be described more fully below with reference to the drawings, in which.

DETAILED DESCRIPTION OF EMBODIMENTS

Figure 1:
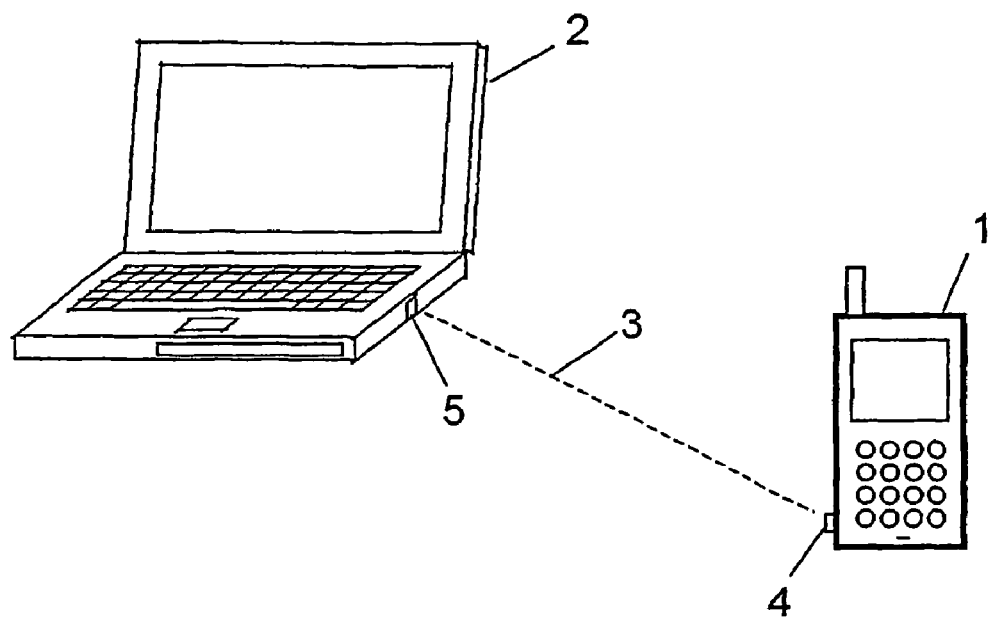
FIG. 1 shows a mobile telephone connected to a personal computer with a connection wherein the invention can be utilized.

FIG. 1 shows a situation in which the invention can be utilized. A mobile telephone 1 is connected to a personal computer 2, which is shown in the figure as a laptop computer, via a communications link 3. The actual communication takes place between a transceiver 4 arranged on the mobile telephone 1 and a transceiver 5 arranged on the computer 2. The type of the communications link 3 can be selected from several different types, such as a wired connection, a short-range radio link or an infrared link. In the following an infrared link implemented according to the well known IrDA (Infrared Data Association) protocol stack will be used as an example, and thus in the example the transceivers 4 and 5 are optical transceivers.

Figure 2:
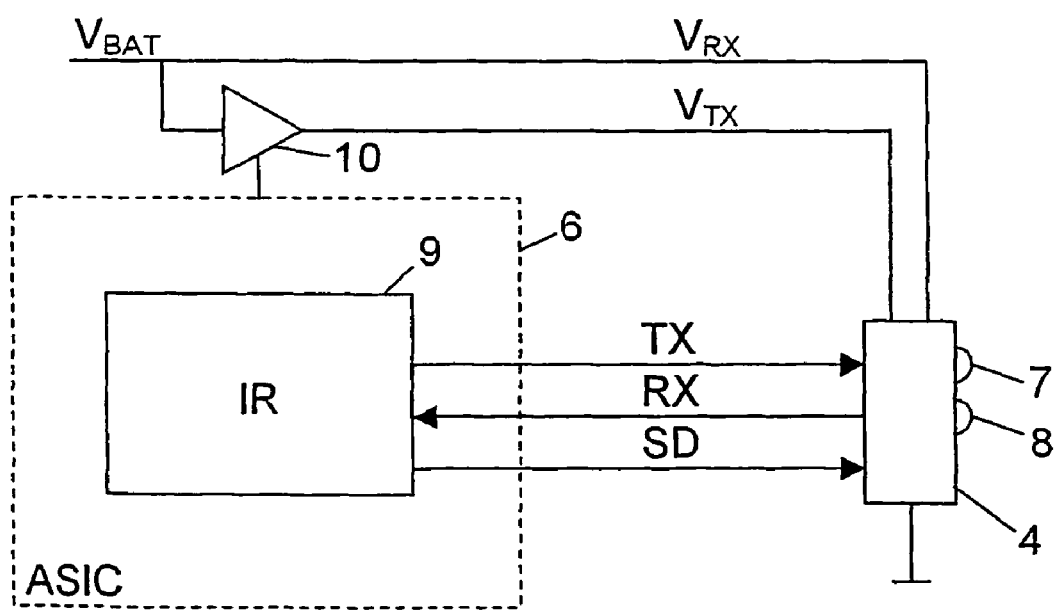
FIG. 2 shows the configuration of an infrared transceiver in which the invention can be utilized.

FIG. 2 shows an example of the hardware configuration of the infrared transceiver 4 and its relating control circuitry 6. The infrared transceiver 4 includes a transmitter diode 7, which will typically be an infrared light emitting diode, and a receiver diode 8, which will typically be a photo diode. The transceiver also contains a pulse encoder and a pulse decoder. The control circuitry 6 is normally implemented in an ASIC, which could also contain other control circuits for the mobile telephone 1. One part of the control circuitry 6 is the IR block 9. This block converts a byte stream into a pulse train for transmission via the pulse encoder and the transmitter diode 7, and it also converts the pulses received via the receiver diode 8 and the pulse decoder into a byte stream. The data, i.e. the pulse train, from the IR block 9 to the transmitter diode 7 are transferred via the line TX, while data from the receiver diode 8 to the IR block are transferred via the line RX.

Power to the infrared transceiver 4 is supplied from a battery (not shown), and, as shown, power may be supplied separately to the receiver and transmitter parts of the transceiver. In the figure the power to the transmitter part is supplied through the switch 10 that may be controlled from the control circuitry 6.

In portable devices it is important to improve the standby time or operating time between each recharging of the battery, and thus it is also important to reduce the power consumption of the device. One way to do this is to reduce the power consumption of the infrared transceiver 4, because typically it will be inactive for long periods. Two power saving solutions are well known. One is by means of a Shutdown (SD) signal from the IR block 9 to the infrared transceiver 4. This signal can put the entire transceiver in a shutdown mode in which both the receiver and transmitter parts are disabled. When SD is active the transceiver is switched off and consumes almost no power. When SD is inactive the transceiver is operational, and it can receive and decode infrared light pulses.

The other power saving solution is to switch off the power supply to the transmitter part by means of the switch 10. In this way the transmitter part is switched off completely, while the receiver part can still be active, provided the SD signal is inactive. This means that the transmitter part only needs to be switched on when data are actually to be transmitted from the transmitter, and since the control circuitry 6 controls the data transmission as well as the power switch 10, it is easy to switch off the transmitter part of the transceiver 4 as soon as it is not needed for transmission of data. However, this is not possible for the receiver part, because normally the control circuitry 6 does not have any knowledge of when data can be expected from the other transceiver 5. Therefore, the SD signal normally has to be inactive all the time to ensure that the receiver part of the transceiver is ready to receive data at any time, in case such data should arrive. As will be explained later, this is especially important because some types of data are only sent once.

The fact that at least the receiver part of the transceiver must be switched on all the time means that the transceiver continuously has a certain power consumption. Some typical figures are that virtually no current is drawn when SD is active, i.e. the whole transceiver is shut down, while a current in the range from 300 µA to 1 mA is drawn when the transmitter part as well as the receiver part are switched on. When only the receiver part is switched on, i.e. power to the transmitter switched off while SD is inactive, the current may be reduced by approximately 25%, but still the remaining consumption is considerable.

In the following the word transceiver will be used to describe not only the transceiver hardware described above, but also the software controlling the hardware.

As mentioned above, the transceivers 4 and 5 in this example make use of the IrDA protocol, and the data are transmitted according to the serial infrared procedure IrDA-SIR (IrDA Serial InfraRed) of this protocol. According to this protocol a transceiver can be in a primary mode or in a secondary mode. In the primary mode the transceiver actively searches for other transceivers of the same type, normally because it has information to transmit. In the secondary mode a transceiver only listens for a transceiver in primary mode to contact it. Normally, there are long periods with no data transmission, and both transceivers 4, 5 will thus be in the secondary mode.

If, for example, data are now going to be transmitted from the computer 2 to the mobile telephone 1, the system will enter the IrDA Discovery Mode and the transceiver 5 will change to the primary mode, thus becoming a primary transceiver. The primary transceiver will search for a secondary transceiver by transmitting a series of discovery frames having start characters in front of them. In IrDA Discovery Mode the primary transceiver will repeat the series of discovery frames with an interval or period which is typically set to 3 seconds although other values are possible as well. In order to ensure that the secondary transceiver is able to detect the discovery frames, the discovery frame must include at least some bits which are different from the situation where no data are sent. Normally, a binary "1" corresponds to "no light transmitted", and a binary "0" corresponds to "light transmitted", and thus the discovery frame must include at least some "0" bits. This is achieved in that the discovery frame starts with 10 XBOF characters, which will be explained below. The discovery frames are sent with a bit rate of 9600 baud.

In IrDA Discovery Mode a sequence of e.g. six, eight or 16 discovery frames, each starting with 10 XBOF characters, is transmitted from the primary transceiver every period. However, this is not the case in another mode, i.e. the IrDA Ultra Mode, which is used for example when sending a so-called vCard (business card). This case is important because the information is only sent once, and there is no option for confirmation or retransmission. Thus the 10 XBOF characters must be detected the first time. Otherwise, the frame format is the same as in IrDA Discovery Mode.

In IrDA-SIR 9600 the XBOF character has the value 0xFF, but some older devices use the value 0xC0 and to ensure compatibility with these devices this value should also be supported. When using SIR the characters are transmitted in an asynchronous serial format with the parameters 1 start bit ("0"), 8 data bits, no parity bit and 1 stop bit ("1"), which is a total of 10 bits. The bits in the character are transmitted from the least significant bit (LSB) to the most significant bit (MSB). Thus the value 0xFF is exchanged as 0, 1, 1, 1, 1, 1, 1, 1, 1, 1, while the value 0xC0 is exchanged as 0, 0, 0, 0, 0, 0, 0, 1, 1, 1. Note that the 0s result in light pulses while 1s do not. 1s can thus not be differentiated from silence, so the detection relies on the 0s.

As mentioned, 10 XBOF characters are sent before the actual data packet, and thus the actual bit stream for the XBOF character 0xFF looks like the sequence below, where it should be noted that the five initial 1s represent the end of the (probably very long) silence period before the first character in the discovery frame.

1, 1, 1, 1, 1, 0, 1, 1, 1, 1, 1, 1, 1, 1, 1, 0, 1, 1, 1, 1, 1, 1, 1, 1, 1, 0, 1, 1, 1, 1, 1, 1, 1, 1, 1, . . .

If the character 0xC0 is used, the sequence will instead be:

1, 1, 1, 1, 1, 0, 0, 0, 0, 0, 0, 0, 1, 1, 1, 0, 0, 0, 0, 0, 0, 0, 1, 1, 1, 0, 0, 0, 0, 0, 0, 0, 1, 1, 1, . . .

Figure 3:
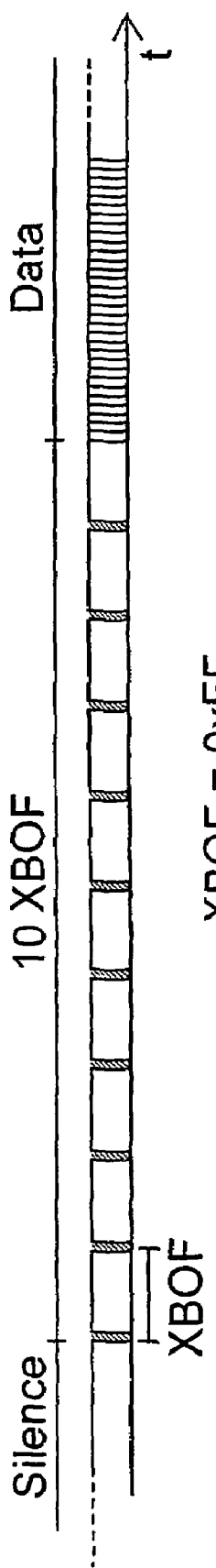
FIG. 3 shows a discovery frame according to the IrDA protocol with the XBOF character having the value 0xFF.
Figure 4:
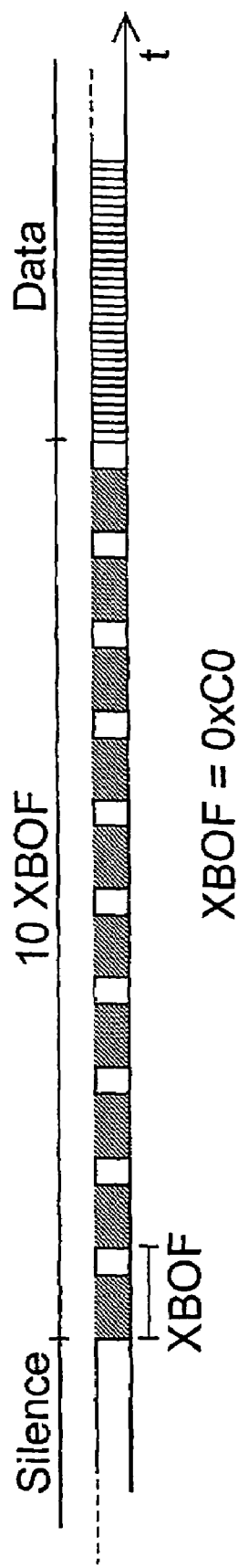
FIG. 4 shows a discovery frame according to the IrDA protocol with the XBOF character having the value 0xC0.

This is also illustrated in FIGS. 3 and 4.

The purpose of the start characters is to "wake up" the receiver to ensure that it will actually receive the following data packets. There is no information content as such in the start characters.

Thus according to the invention the receiver—when it is in the secondary mode waiting for another transceiver to send a discovery frame—is continuously switched on and off in order to save power. This means that the receiver is shut down for certain intervals. The receiver just has to be switched on often enough and long enough to be able to detect at least one of the zeros in the ten XBOF characters. Then if a zero, and thus a start character, is detected, the receiver is maintained on of course as long as data still arrive from the other end.

At 9600 baud the duration of every bit is $1/9600=104.2$ microseconds. Thus an XBOF character (10 bits) takes 1.042 milliseconds, and at least one of these ten bits is a zero. 10 XBOF characters take about 10.42 milliseconds to be transmitted. Thus, theoretically, it is sufficient if in any period of 10.42 milliseconds the receiver is active in a period of 1.042 milliseconds. This period is called an eye period.

In practice, however, it is more safe to take into account the possibility of enabling the receiver in the middle of a zero bit and thereby missing it. Thus the eye period can be extended to 1.146 milliseconds (11 bits), and similarly the repetition period can be reduced a little bit. Practical tests have shown that a repetition period of 9 milliseconds with an eye period for the receiver of 1.4 milliseconds is completely secure, but values closer to the theoretical values mentioned above are probably possible.

Figure 5:
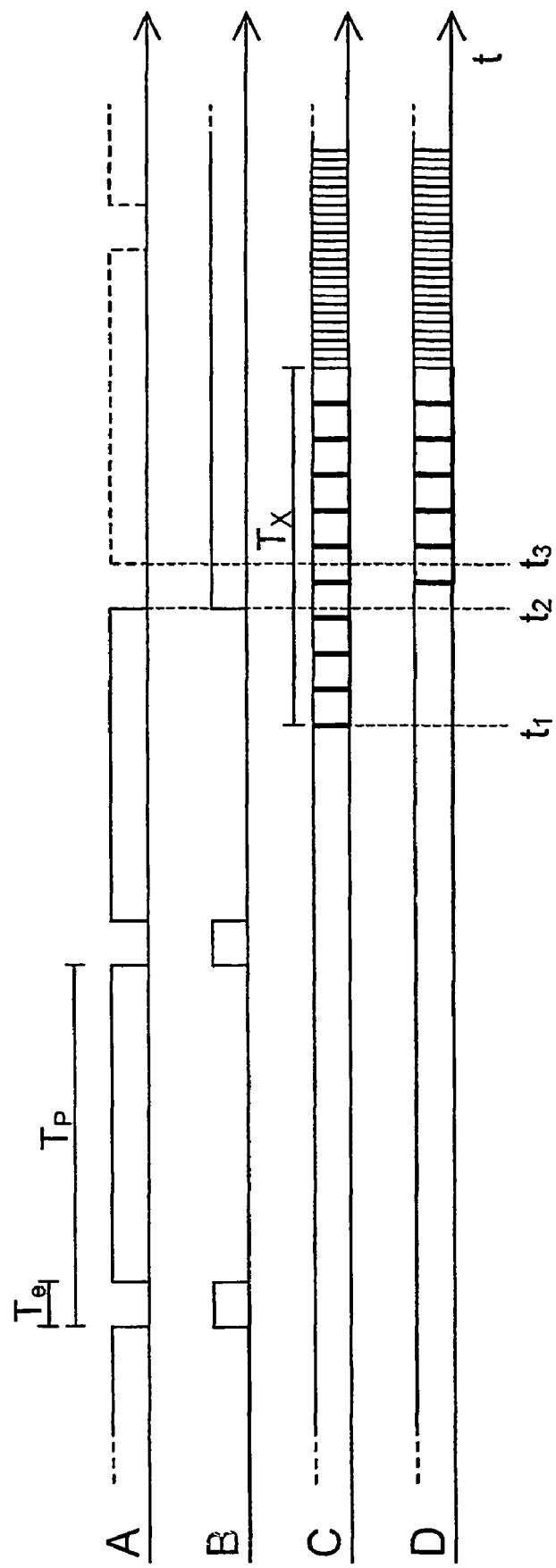
FIG. 5 shows an example of the signals in a circuit according to the invention.

The principle is illustrated in the graph of FIG. 5. A illustrates the signal SD in the transceiver 4 when this transceiver is in the secondary mode waiting for the other transceiver 5 to contact it. It will be seen that in each period $T_P$ the signal SD is low (i.e. not active) only in the eye period $T_e$. B correspondingly shows that the receiver part of the transceiver 4 is switched on, i.e. ready to receive incoming optical signals in the eye periods $T_e$, while it is shut down in the rest of the period. C shows a discovery frame sent from the other transceiver 5, and finally D shows what is actually received in the transceiver 4. C and D correspond to FIG. 3, i.e. the XBOF character has the value 0xFF and the zeros are represented by the black lines. The period $T_P$ is selected to be shorter than, but close to, the duration $T_x$ of the ten XBOF characters, and the eye period $T_e$ selected to be longer than, but close to, the duration of one XBOF character.

At the time $t_1$ a discovery frame from the transceiver 5 begins, and in the shown example the first four zeros are not detected because the transceiver is shut down. However, at the time $t_2$ the SD signal becomes low and the receiver is again ready to receive for an eye period $T_e$, i.e. until the time $t_3$. The zero of the fifth XBOF character lies in this eye period and is thus detected. Although the SD signal was otherwise expected to be activated again at the time $t_3$, as is shown with the dashed lines in A, it is now kept low and the receiver is ready to receive the remaining XBOF characters and the following data. Of course the receiver is now kept in the switched on state as long as data are exchanged between the two transceivers. A certain time after the exchange of data has been concluded, the receiver returns to the state in which it is only switched on in the eye periods.

It will be seen that independent of the start time of the discovery frame at least one of the zeros in the ten XBOF characters will be detected, and this is sufficient to ensure safe reception of the following data bytes.

Since the eye period can theoretically be close to one tenth of the repetition period, the power consumption of the receiver part of the transceiver in the discovery mode can also be reduced to close to one tenth of the normal power consumption. Although in practice, as mentioned above, the eye period has to be a little bit longer and the repetition period a little bit shorter, the power consumption can still be reduced to maybe 12 or 15% of the normal power consumption.

When an infrared interface without this solution is implemented in a mobile telephone, the transceiver typically consumes about 10% of the total stand-by current of the phone. Therefore, the user will often prefer to switch the interface on and off manually to save power. With the solution implemented this value can be reduced to maybe 1 or 2%, which means that the transceiver can now be switched on the whole time without affecting the stand-by time of the phone very much. When the transceiver can be switched on all the time, a user interface to switch it on and off is no longer needed, and it can thus be removed from the phone, which gives a simpler design of the phone user interface.

It should be noted that the feature activates itself when there is no other transceiver in range, but also when another device has actually been found but does not contact the transceiver in which the solution is implemented.

The fact that the transceiver is always on also means that it is always ready to receive an electronic business card that is beamed to the device. This is important because such a business card is only transmitted once. Today an IR interface has to be enabled or switched on for some time before a business card can be received.

The SD signal can be controlled from either hardware or software, and thus the solution itself can also be implemented in hardware as well as in software, dependent on what is most convenient in a given device.

Although a preferred embodiment of the present invention has been described and shown, the invention is not restricted to it, but may also be embodied in other ways within the scope of the subject-matter defined in the following claims. Thus, the invention has been described above with relation to an infrared interface operated according to the IrDA protocol. However, it should be emphasized that any other protocol using a number of start characters as the beginning of a transmission can be used as well. Further, it is clear that electrical signals on a wired connection or radio signals transmitted through a radio link, e.g. a short-range radio link, can easily be used instead of the optical signals without affecting the idea of the invention.

The invention claimed is:

1. A method of establishing a communications link for exchanging digital signals in the form of characters between a transmitter and a receiver, said digital signals being transmitted according to the IrDA protocol, wherein the transmitter for initialization of a communications link transmits a series of start characters, the method comprising the steps of:
controlling the receiver to alternate periodically between a first state in which characters can be detected, and a second state in which detection of characters is not possible, with a period shorter than the duration of the series of start characters, the receiver having a power consumption which is higher in the first state than in the second state, and the alternation being controlled such that in each period the receiver assumes the first state for a time which is longer than the duration of a start character; and
establishing a communications link if a character is detected,
wherein the start characters are according to the IrDA protocol.

2. The method according to claim 1, further comprising the step of keeping the receiving circuitry in the first state for a longer time when a communications link is established.

3. The method according to claim 1, characterized in that said digital signals are transmitted via a wired connection.

4. The method according to claim 1, characterized in that said digital signals are transmitted via a radio channel.

5. The method according to claim 1, characterized in that said digital signals are transmitted via an infrared channel.

6. The method according to claim 1, characterized in that said digital signals are transmitted with a data rate of 9600 bit/s.

7. The method according to claim 1, characterized in that said start character is an XBOF character.

8. The method according to claim 1, wherein the method is performed in a mobile telephone.

9. A communications interface device having receiving circuitry for receiving digital signals, said signals being transmitted according to the IrDA protocol and said signals being in the form of characters from an external transmitter according to a protocol defining that a communications link is to be initialized by transmitting a series of at least a prescribed number of start characters, each start character having a specified duration, said receiving circuitry being able to assume a first state in which characters can be detected, and a second state in which detection of characters is not possible, and said receiving circuitry having a power consumption which is higher in the first state than in the second state, the device comprising:
control means adapted to alternate the receiving circuitry periodically between the first state and the second state with a period shorter than the duration of the series of start characters, such that in each period the receiving circuitry assumes the first state for a time which is longer than the duration of a start character,
wherein the control means is further adapted to establish a communications link if a character is detected, and
wherein the start characters are according to the IrDA protocol.

10. The communications interface device according to claim 9, characterized in that the control means is further adapted to keep the receiving circuitry in the first state for a longer time when a communications link is established.

11. The communications interface device according to claim 9, characterized in that said receiving circuitry is adapted to receive the digital signals as electrical signals on a wired connection.

12. The communications interface device according to claim 9, characterized in that said receiving circuitry comprises a receiver for radio frequency signals.

13. The communications interface device according to claim 9, characterized in that said receiving circuitry comprises a receiver for infrared signals.

14. The communications interface device according to claim 9, characterized in that the receiving circuitry is arranged to communicate with a data rate of 9600 bit/s.

15. The communications interface device according to claim 9, characterized in that said start character is an XBOF character.

16. The communications interface device according to claim 9, characterized in that the device further comprises transmitter circuitry.

* * * * *